United States Patent [19]

Nelissen et al.

[11] Patent Number: 5,079,268

[45] Date of Patent: Jan. 7, 1992

[54] POLY(ALKENYL SUBSTITUTED AROMATIC) AND ELASTOMER CONTAINING POLYMER COMPOSITIONS AND PROCESS FOR THEIR PREPARATION

[75] Inventors: Laurentius N. I. H. Nelissen;
Gerardus J. M. DE Koning, both of
Eindhoven; Johannes M. Zijderveld,
Breda, all of Netherlands

[73] Assignee: Shell Research Limited, United Kingdom

[21] Appl. No.: 528,881

[22] Filed: May 30, 1990

[30] Foreign Application Priority Data

Jun. 23, 1989 [GB] United Kingdom ............... 8914470
Jan. 29, 1990 [GB] United Kingdom ............... 9001975

[51] Int. Cl.$^5$ .......................... C08J 9/20; C08F 283/08
[52] U.S. Cl. ..................................... 521/81; 525/149;
525/152; 525/391; 525/392; 525/905
[58] Field of Search ............... 525/149, 152, 391, 392,
525/905; 521/81

[56] References Cited

U.S. PATENT DOCUMENTS

| | | | |
|---|---|---|---|
| 3,306,874 | 2/1967 | Hay ..................... | 528/215 |
| 3,375,228 | 3/1968 | Holoch et al. ............. | 525/390 |
| 3,664,977 | 5/1972 | Nakanishi et al. ........... | 525/132 |
| 4,048,143 | 9/1977 | Hay et al. ................. | 525/397 |
| 4,118,348 | 10/1978 | Bennett et al. ............ | 525/145 |
| 4,148,843 | 4/1979 | Goosens .................. | 525/132 |
| 4,391,950 | 7/1983 | Cooper ................... | 525/132 |
| 4,654,405 | 3/1987 | Jalbert et al. ............. | 525/391 |
| 4,782,098 | 11/1988 | Allen et al. ............... | 521/81 |
| 4,806,602 | 2/1989 | White et al. .............. | 525/397 |

FOREIGN PATENT DOCUMENTS

| | | |
|---|---|---|
| 0009638 | 9/1979 | European Pat. Off. . |
| 0095098 | 5/1983 | European Pat. Off. . |
| 0209874 | 7/1986 | European Pat. Off. . |
| 0297633 | 5/1988 | European Pat. Off. . |
| 0298365 | 6/1988 | European Pat. Off. . |
| 1494759 | 12/1977 | United Kingdom . |
| 1514408 | 6/1978 | United Kingdom . |

*Primary Examiner*—John C. Bleutge
*Assistant Examiner*—Thomas Hamilton, III

[57] ABSTRACT

Poly(alkenyl substituted aromatic) and elastomer containing polymer compositions, obtainable by a process comprising:

(a) conversion of polyphenylene ether or a structurally related polymer thereof with an acid halide, an acid anhydride or ketene, in at least one alkenyl substituted aromatic monomer;

(b) dissolution of at least one EPDM rubber and an optionally partially hydrogenated diblock copolymer A—B, optionally mixed with minor amounts of triblock copolymers ABA, wherein A represents a poly(alkenyl aromatic) block and B represents an optionally, partially hydrogenated poly conjugated diene block;

(c) prepolymerization of the obtained mixture until a polymerization degree of from 5 to 20%;

(d) suspending the prepolymerized mass into an aqueous medium;

(e) polymerization by thermal initiation or by initiation by means of at least one free radical initiator, optionally in the presence of an expanding agent;

and a process for the preparation of such polymer compositions.

16 Claims, 1 Drawing Sheet

POLY(ALKENYL SUBSTITUTED AROMATIC) AND ELASTOMER CONTAINING POLYMER COMPOSITIONS AND PROCESS FOR THEIR PREPARATION

BACKGROUND OF THE INVENTION

The invention is relating to poly(alkenyl substituted aromatic) and elastomer containing polymer compositions and more particularly to polymer compositions containing polyphenylene ethers or structurally related polymers, poly(alkenyl substituted aromatic) and elastomers, and to their preparation.

A great variety of processes for the preparation of compositions containing a polyphenylene ether resin, an elastomer and a poly(alkenyl aromatic) resin has already been proposed in the past in order to improve the mechanical properties of such polyphenylene ether resin and poly(alkenyl aromatic) resin compositions.

For example U.S. Pat. No. 3,664,977 discloses a resin improved in impact resistance obtained by continuously subjecting to thermic bulk polymerization a mixture composed mainly of an alkenyl aromatic compound (78-85 parts by weight) and containing a rubber substance selected from inter alia crepe rubber, butadiene-styrene copolymer rubber, butadiene-acrylonitrile copolymer rubber, polyisoprene rubber, polybutadiene rubber and ethylene propylene rubber in an amount of 30 to 10 parts by weight, at a temperature of 70°-170° C. and adding to the polymerization mixture a polyphenylene ether in a proportion of 4.0 to 20 per cent by weight based on the total weight of the final polymer at a time of from the stage immediately after formation of a dispersoid of the rubbery polymer to the stage at which the total polymer concentration reached 40% by weight, and continuing the bulk polymerization of the resulting mixture under sufficient stirring at a temperature of 70°-170° C. to complete the polymerization.

From e.g. German patent No. 2,342,119 are known high resistant thermoplastic compositions, which comprise (a) a polyphenylene ether resin, representing preferably 20 to 80% by weight of composition, and
(b) a rubber modified polystyrene resin, wherein said rubber modified polystyrene represents a polystyrene matrix, wherein a discontinuous phase consisting of styrene homopolymer particles, which are enveloped in a diene rubber membrane, has been regularly dispersed and said particles showing an average size in the range of from about 0.1 to about 0.7 μm, whereas the membrane thickness being not greater than about ¼ of the average particle diameter and the diene rubber content being from 1 to 10 by weight of the rubber modified polystyrene and more preferably from 3 to 8% by weight.

Hereafter, for example U.S. Pat. No. 4,118,348 discloses a specific process for the preparation of a composition comprising rubber, a polyphenylene ether resin and an alkenyl aromatic addition polymer, which comprises using an alkenyl aromatic monomer as a solvent for the oxidative coupling of a phenol to a polyphenylene ether resin and thereafter adding a rubber and polymerizing the mixture to form said blend of rubber, an alkenyl aromatic addition polymer and a polyphenylene ether resin.

The rubber component amount may vary from 1 to 25 parts by weight, the alkenyl aromatic addition polymer from 5 to 95 parts by weight and polyphenylene ether resin from 10 to 90 parts by weight.

U.S. Pat. No. 4,148,843 discloses a process for the preparation of a composition which comprises:

(a) a polyphenylene oxide resin that is capped with a compound selected from the group of acid halides acid anhydrides and ketenes; and
(b) an alkenyl aromatic resin;

said process comprising forming a mixture of a capped polyphenylene oxide in an alkenyl aromatic monomer and thereafter heating said mixture for a sufficient period of time at an elevated temperature to form said composition.

Although there is indicated in column 3, lines 35-47 that a variety of rubbery impact modifiers may be added in principle to the composition, not any teaching is given to a person skilled in the art to reach final compositions, which show the presently desired characteristics in order to meet the requirements which are posed on modern engineering plastics.

Also from e.g. British patent No. 1,494,759 a process is known for the preparation of a polymer, which comprises polymerizing an alkenyl aromatic compound in the presence of an ethylene/propylene/tercomponent rubber by a two step mass suspension process, the first step of the process comprising a mass polymerization carried out in the presence of oxygen, the pressure in the first step being from 0.05 to 10 atmospheres gauge.

More particularly rubbers are used obtainable by polymerization of from 70 to 30% by weight of ethylene, 30 to 70% by weight of propylene and from 0.5 to 15% by weight, calculated on the total amount of ethylene and propylenes of a diolefin as the tercomponent, such as 5-ethylene norbornene, dicyclopentadiene, 2,2,1-bicycloheptadiene and 1,4-hexadiene, whereas the rubber component is preferably used in an amount of from 1 to 20% by weight and more preferably of from 4 to 15% by weight based on the vinyl aromatic compound and the rubber component.

An improvement to the latter process was disclosed in e.g. British patent No. 1,514,408 indicating that especially the second step of the process is comprising a suspension polymerization carried out in the presence of a very specific group of a peroxy carboxylic acid esters and preferably those formed in situ from a chloroformic acid ester and a hydroperoxide.

From e.g. European patent application No. 0095098 thermoplastic masses are known, based on modified, high impact styrene polymers and polyphenylene ethers, which in addition comprise a combination of (a) 90-10 parts by weight of an elastomer block copolymer of the type AB, ABA' and/or (AB)$_n$-X, wherein A and A' represent polymerized vinyl aromatic hydrocarbon blocks and B represents hydrogenated and/or non-hydrogenated polymerized conjugated blocks, and wherein X represents the residue of a multifunctional coupling agent and n an integer of at least 3, and
(b) 10-90 parts by weight of an ethylene copolymer having a density d=0.910-0.945 (g/cm$^3$), consisting of
    (b$_1$) 80-99% by weight of ethylene, and
    (b$_2$) 1-20% by weight of a 1-olefin, having at least four carbon atoms.

The teachings of this European patent application are clearly directed on the preparation of polymer blends by mechanical blending e.g. in an extruder, giving rise to a matrix, wherein two phase structure particles have been dispersed.

With reference to the described results in particular in the table on page 17, a person skilled in the art, in charge of the manufacture of polymer blends showing improved characteristics which may meet the present requirements, would certainly not be inclined to concentrate further research on compositions, comprising ethylene/propylene copolymers.

From e.g. European patent application No. 0009638 a process is known for the manufacture of alkenyl aromatic homo- or copolymers by continuous mass polymerization, initiated thermally or by means of free radical initiators, of an alkenyl aromatic compound or a mixture of alkenyl aromatic compounds, optionally in the presence of a nitrile or an ester of acrylic or methacrylic acid and/or a natural or synthetic rubber, with a one-, two- or multistage continuous prepolymerization and subsequent one- two- or multistage continuous main polymerization and final working up, the polymerization mixture being subjected to heat exchanging and uniform static mixing during the main polymerization stage(s). The process is used particularly in the homo- or copolymerization of styrene, especially the copolymerization with alphamethylstyrene optionally in the presence of EPDM (ethylene-propylene-5-ethylidene-norbornene-2) rubber.

E.g. European patent application No. 0209874 discloses a hydrogenated block copolymer composition, showing a compression set (JIS K 6301; 100° C.×22 hours; and compressibility 25%) of 65% or less as rubber which comprises (a) 100 parts by weight of hydrogenated block copolymer obtained by hydrogenating a block copolymer comprising at least two polymer blocks A composed mainly of a vinyl-substituted aromatic hydrocarbon and at least one polymer block B composed mainly of a conjugated diene, (b) 11 to 233 parts by weight of a homopolymeric and/or copolymeric polyphenylene ether resin, having a reduced viscosity in a range of from 0.15 to 0.70 as measured at 30° C. in a 0.5 g/dl chloroform solution, (c) 10 to 500 parts by weight, preferably 100 to 500 parts by weight of a non-aromatic softening agent for rubber, and (d) 5 to 150 parts by weight of a polyolefin resin and/or polystyrene resin.

These compositions were prepared by the usual compounding techniques, using melt-kneaders such as single-screw, extruders, twin-screw extruders, Banbury mixers, heating rolls and the like.

From e.g. European patent application No. 297,633 a polymer mixture is known, comprising a polyphenylene ether, a polyamide and an agent to improve the impact strength, the latter comprising (a) 10–90 parts by weight of partially hydrogenated diene-vinyl aromatic diblock copolymer, (b) 90–10 parts by weight of partially hydrogenated diene-vinyl aromatic polyblock copolymer with at least three blocks.

The polymer mixture may optionally comprise in addition thereto fillers, reinforcing fibres, flame retardants, stabilizers, dyes and/or pigment(s) and also an agent to improve the compatibility between the polyphenylene ether and the polyamide.

As may be clearly derived from e.g. Japanese patent applications Nos. 63,289,060; 63,289,061; 63,256,650 and 63,251,457, recent research and development efforts were mainly directed to the application of modified block copolymers of a polyalkenyl aromatic (e.g. styrene) and a conjugated diene, optionally further converted by hydrogenation and by linking carboxylic acid radicals or their derivatives in its units, in compositions comprising polyphenylene ether resin and rubber modified poly(alkenyl substituted aromatic) resin, in order to reach the presently required thermal and mechanical properties and combustibility.

It will be appreciated that according to these Japanese patent applications relatively large amounts of expensive modified block copolymers are to be used for obtaining sufficiently interesting properties of the final compositions.

From e.g. European patent application No. 0,298,365 thermoplastic compositions are known, comprising as essential components (a) from 5 to 94% by weight of a polyamide, (b) from 5 to 94% by weight of a polyphenylene ether, (c) from 1 to 20% by weight of a partially hydrogenated PQP'-block copolymer, wherein $\alpha$) the blocks P and P' are prepared from vinyl-substituted aromatic monomers and the total fraction of these blocks in the block copolymers is in the range of from 25 to 40% by weight, $\beta$) the number average molecular weight of the block P is at most 8000 and smaller than the number average molecular weight of the block P', $\gamma$) the block Q is prepared from conjugated diene monomers and represents in total from 60 to 75% by weight of the block copolymer, and $\delta$) from 5 to 30% by weight of the double bonds in block Q are not hydrogenated as well as in addition, (d) from 0 to 50% by weight of a vinyl aromatic polymer.

In e.g. European patent application No. 0300178 a polymer mixture is disclosed, which comprises (a) 10–90% by weight of a polyphenylene ether, (b) 0–90% by weight of a fluorine-containing olefinic homopolymer or copolymer, the weight percentages of A and B being calculated with respect to the sum of the quantities by weight of A plus B, (c) 1–80 parts by weight of a vinylaromatic alkyl-(meth)acrylate copolymer, (d) 1–20 parts by weight of an hydrogenated, block copolymer having one or more blocks derived from conjugated diene units and having one or more blocks derived from vinyl-aromatic units, (e) 0–200 parts by weight of a styrene homopolymer and/or rubber-modified styrene polymer, and (f) 0–50 parts by weight of conventional additives, the parts by weight of C, D and E being calculated per 100 parts by weight A and B.

In spite of extensive continuing research and development there still remains a large need for an economically attractive process for the manufacturing of polymer compositions showing the required thermal and mechanical properties and combustibility.

OBJECTS AND SUMMARY OF THE INVENTION

An object of the present invention is therefore to provide poly(vinyl substituted aromatic) containing polymer compositions, showing improved properties, and to provide a manufacturing process for obtaining them in an economically attractive way.

As result of extensive research and experimentation, such desired poly(alkenyl substituted aromatic) containing polymer compositions are surprisingly found to be obtainable by a process comprising:

(a) conversion of polyphenylene ether or a structurally related polymer thereof of the formula

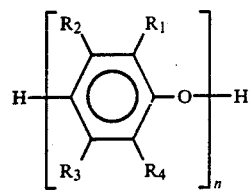

(I)

wherein $R_1$ and $R_4$ each may represent hydrogen, halogen, a phenyl group, alkenyl group, alkadienyl group, an aryloxy group, or wherein $R_1$ and $R_4$ each may represent an alkyl group or an alkoxy group, each of the latter containing 12 or less carbon atoms and each optionally substituted by halogen, cyano, hydroxy, phenyl or amino, whereas alkyl or alkoxy groups attached to the terminal phenol nucleus of the chain may be substituted by an amino, dialkylamino or a di(alkanoyl) amide group, wherein the alkyl groups each contain 4 or less carbon atoms, wherein $R_2$ and $R_3$ each may represent hydrogen, halogen, a phenyl group, alkenyl group, alkadienyl group, aryloxy group or wherein $R_2$ and $R_3$ each may represent a primary or secondary alkyl group or alkoxy group as defined for $R_1$ and $R_4$, optionally substituted by halogen, cyano, hydroxy, phenyl, and wherein $R_1$, $R_2$, $R_3$ and $R_4$ may represent different or the same groups in one repeating unit, and n represents an integer having a value of at least 50 and more preferably 100 to 500, with an acid halide, an acid anhydride or ketene, in at least one alkenyl substituted aromatic monomer, the amount of polyphenylene ether or structurally related polymer being in the range of from 5 to 30% by weight and preferably from 10 to 25% by weight, relative to the weight of the complete final composition;

(b) dissolution of at least one ethylene-propylenediene monomer (EPDM) rubber having a specific density in the range of from 0.85 to 0.95, a Mooney viscosity (ML(1+4) 125° C.) in the range of from 30 to 80, an ethylene content in the range of from 50 to 70% by weight, in an amount of from 5 to 20% by weight, and preferably from 7 to 15% by weight, and an optionally partially hydrogenated diblock copolymer A—B, optionally mixed with minor amounts of triblock copolymers A—B—A, wherein A represents a poly(alkenyl aromatic) block and B represents an optionally partially hydrogenated poly conjugated diene block, having a number average molecular weight in the range of from 10,000 to 1,000,000, and showing a glass transition temperature of −20° C. or below, in an amount of from 1 to 5% by weight calculated on the weight of the complete final composition;

(c) prepolymerization of the obtained mixture until a polymerization degree of from 5 to 20% and preferably from 8 to 15%;

(d) suspending the prepolymerized mass into an aqueous medium;

(e) polymerization by thermal initiation or by initiation by means of at least one free radical initiator, optionally in the presence of an expanding agent.

DETAILED DESCRIPTION OF THE INVENTION

Figure 1:
FIGS. 1 and 2 are photomicrographs of the composition of the present invention.

The conversion in step (a) may be carried out in one or more vinylsubstituted aromatic monomers selected from styrene, α-methyl styrene, 2,4-dichlorostyrene, p-methoxystyrene, p-nitrostyrene, p-methylstyrene, 3,4-dimethylstyrene, m-tert-butylstyrene, p-dodecylstyrene, p-phenylstyrene, p-acetoxystyrene, divinylbenzene, p-aminostyrene, p-(chloromethyl)-styrene, m-cyanostyrene, o-hydroxystyrene, p-vinylbenzoic acid, α-propylstyrene, 3,5-diethylstyrene, 2,4,6-trimethylstyrene, 4-p-tolylstyrene, 3,5-diphenylstyrene, 3-ethylvinylnaphthalene, α-undecylstyrene, o-methyl-α-methylstyrene, m-methyl-α-methylstyrene, p-methyl-α-methylstyrene, p-methoxy-α-methylstyrene, p-cyano-α-methylstyrene, m-bromo-α-methylstyrene, p-chloro-α-methylstyrene, phenyl-1-vinylnaphthalene and 1,1-diphenylethylene or mixtures thereof of which styrene alone or predominantly styrene containing monomer mixtures are preferred.

More preferably the conversion is carried out in styrene, optionally mixed with α-methylstyrene.

Typical examples of the capping agents to be used in step (a) include those disclosed in e.g. European patent applications Nos. 0,261,574 and 0,264,623 and U.S. Pat. Nos. 4,048,143; 4,189,417; 4,156,773 and 4,156,422.

Although to one preferred embodiment of step (a), the conversion is carried out with an acid halide or a non-cyclic acid anhydride as capping agent selected from compounds of the general formulae

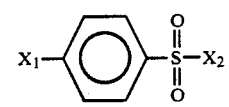

(II A)

or

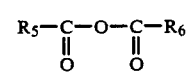

(II B)

wherein $X_1$ represents halogen or an alkyl group containing 1 to 4, more preferably 1 or 2 carbon atoms, and which may optionally be substituted by halogen, wherein $X_2$ represent halogen, and wherein $R_5$ and $R_6$ each independently may represent an alkyl, alkenyl, aryl (preferably phenyl) or aralkyl (preferably aryl lower alkyl) group, containing from 1 to 12 carbon atoms and optionally being substituted by hydroxy, halogen and preferably bromine, alkyl containing 1-4 carbon atoms, or a free or esterified carboxy group, in the presence of a catalyst of the formula:

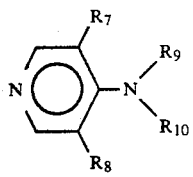
(III)

wherein $R_9$ and $R_{10}$ both represent in general non-electron withdrawing groups such as alkyl groups containing from 1 to 4 carbon atoms, optionally substituted by at most one phenyl group and wherein the symbols $R_7$ and $R_8$ represent hydrogen, halogen or lower alkyl, while $R_9$ and $R_{10}$ may represent different or the same groups in one molecule, and optionally in the presence of a neutralizing agent.

Preferred capping agents are compounds according to formula IIa selected from para substituted phenylsulphonyl halides, wherein $X_1$ represents bromine, or a methyl or ethyl group substituted by bromine, and wherein $X_2$ represents bromine or chlorine, of which parabromomethylphenylsulphonyl bromide or parabromomethylphenylsulphonyl chloride are most preferred; or compounds according to formula IIb selected from those wherein $R_5$ and $R_6$ represent the same group of which acetic anhydride, benzoic anhydride and bromoacetic anhydride are in particular preferred, of which acetic anhydride is the most preferred.

Preferred catalysts are those compounds according to formula III, wherein $R_9$ and $R_{10}$ represent both methyl groups or ethyl groups whereas $R_7$ and $R_8$ preferably represent hydrogen, chlorine or a methyl group. Most preferably N,N-dimethyl-4-aminopyridine (DMAP) is used as catalyst.

As acid neutralizing agent may be used in principle any basic compound which may sufficiently dissolve in the reaction medium; more particularly an organic base is used such as N,N'-di(t-butyl)ethylenediamine, N,N'-dimethylbutylamine, di(n-butyl)amine, triethylamine, diethylamine, picoline, quinoline, pyridine, pyrimidine, quinoxalines, tri-n-propylamine, triisopropylamine, dimethylisopropylamine and the like, of which triethylamine or tri-n-propylamine are preferred.

The acid neutralizing agent is normally only used when acid halides are applied as capping agents.

According to another preferred embodiment of step (a) the conversion is carried out with a cyclic anhydride as: capping agent, selected from the general formula

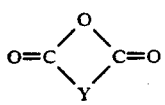
(IV)

wherein Y represents a bivalent radical of the formulae:

(V)

or

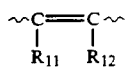
(VI)

wherein m represents an integer in the range of from 2 to 8 and more preferably in the range of from 2 to 4 and wherein $R_{11}$ and $R_{12}$ may each independently represent an alkyl group of 1 to 4 carbon atoms, a phenyl group or an aralkyl group and preferably benzyl or wherein $R_{11}$ and $R_{12}$ together with the carbon atoms of the double carbon-carbon bond may form a cycloalkenyl, cycloalkadienyl or aryl group, and more preferably a phenyl group, in the presence of a non-nucleophilic base, preferably a metal hydride, and more preferably sodium hydride or potassium hydride.

More preferably, a combination of maleic anhydride and sodium hydride is used.

It will be appreciated that the compositions obtainable according to the process of the present invention are characterized by a chemical blending, which has appeared to lead to a continuous micro structure causing the found improved mechanical and thermal characteristics.

Typical examples of the polyphenylene ether or structurally, related polymers according to formula I which may be applied for the process of the present invention, include poly-2,6-dimethyl-1,4-phenylene ether (PPE); poly-2,6-diethyl-1,4-phenylene ether; poly-2,6-dipropyl-1,4-phenylene ether; poly-2-methyl-6-allyl-1,4phenylene ether; poly-di-tert-butyldimethoxy-1,4-phenylene ether; poly-2,6-dichloromethyl-1,4-phenylene ether; poly-2,6-dibromomethyl-1,4-phenylene ether; poly-2,6-di(2-chloroethyl)-1,4-phenylene ether; poly-2,6-ditolyl-1,4-phenylene ether; poly-2,6-dichloro-1,4-phenylene ether; poly-2,6-diphenyl-1,4-phenylene ether and poly-2,5-dimethyl-1,4-phenylene ether, the terminal phenol nucleus of which may bear an aminoalkyl or di(alkyl)amino alkyl group on the ortho sites.

Preferably the symbols $R_1$, $R_2$, $R_3$ and $R_4$ in formula I represent hydrogen or an optionally substituted alkyl, containing from 1 to 4 carbon atoms and more particularly $R_1$ and $R_4$ may represent, when attached to the terminal phenol nucleus of the polyphenylene ether chain, an aminoalkyl or a (dialkylamino) alkyl group, the alkyl groups of which are containing from 1 to 4 carbon atoms.

More preferably the symbols $R_1$, $R_2$, $R_3$ and $R_4$ are selected from hydrogen and methyl, optionally substituted as defined hereinbefore, whereas $R_1$ and $R_4$ may represent when attached to the terminal phenol nucleus of the chain, an aminomethyl or a (dialkylamino)methyl group, the alkyl groups of which are containing of from 1 to 4 carbon atoms, e.g. di(n-butyl)amino, and $R_2$ and $R_3$ represent hydrogen.

The most preferred embodiment of the starting compounds according to formula I is poly-2,6-dimethyl-1,4-phenylene ether, wherein one or both of the methyl groups attached to the terminal phenol nucleus of the chain, have been substituted by an amino or dialkylamino group, the alkyl groups of which are containing of from 1 to 4 carbon atoms.

The EPDM rubbers which are included in the compositions to be prepared according to the present invention may be selected from copolymers derived from ethylene, propylene and one or more norbornene derivatives such as dicyclopentadiene or ethylidene norbornene.

Generally copolymers containing from 50 to 70% by weight ethylene, and from 0.5 to 12% by weight and preferably from 4 to 9% by weight of a norbornene derivative and show a number average molecular weight Mn in the range of from 40-90 kg/mole and an Mw/Mn ratio in the range of from 2.0 to 4 and more preferably in the range of from 3.0 to 3.5.

It will be appreciated that the EPDM rubbers to be included will primarily be selected on solubility in the vinyl substituted aromatic monomer to be applied and more particularly styrene.

Suitable examples for this purpose are e.g. Keltan K 312, Keltan 514, Keltan 740 and Keltan K 470 (Trade marks).

With the term "optionally partially hydrogenated" as used throughout the specification with reference to block copolymers, is meant that only the poly(conjugated diene) blocks have been predominantly hydrogenated, if any, and substantially not the poly(alkenyl substituted aromatic) blocks.

It will be appreciated that with the term "minor amounts of triblock copolymers A—B—A" is meant that these copolymers may be present in an amount of at most 20% by weight and preferably lower than 5% by weight.

The diblock copolymer A—B and optionally minor amounts of present triblock copolymers A—B—A to be incorporated in the compositions to be prepared according to the present invention may be selected from copolymers, which preferably have a number average molecular weight in the range of from 50,000 to 800,000 and which have a content of the alkenyl substituted aromatic in the range of from 20 to 40% by weight and more preferably from 25 to 35% by weight.

More preferably diblock copolymers may be applied which comprise one polystyrene block or random polymer block derived from predominantly styrene and a minor amount of conjugated diene, and one block of polyisoprene or poly-1,3-butadiene which has been hydrogenated after the polymerization to at least 80 mol % of the original unsaturation and more preferably to at least 95% of the unsaturation in the polybutadiene or polyisoprene block.

Preferred block copolymers have a number average molecular weight in the range of from 70,000 to 500,000 and molecular weight distribution of from 1.0 to 1.5 and more preferably in the range of from 1.01 to 1.10.

Most preferably diblocks AB are used showing a bonded styrene content of from 25-40% by weight and wherein block A has a number average molecular weight of from 15,000 to 50,000 and more preferably from 15,000 to 20,000, and an amount of the 1,2 vinyl bond of polybutadiene before hydrogenation in the range of from 25 to 40% and more preferably from 30 to 35% by weight.

Suitable polymer blocks A may be prepared from e.g. styrene, α-methylstyrene, 2,4-dichlorostyrene, p-methoxystyrene, p-methylstyrene, 3,4-dimethylstyrene, m-tert-butylstyrene, p-phenylstyrene, p-acetoxystyrene, divinylbenzene, 1-vinylnaphthalene, 3,5-diethylstyrene, 4-n-propylstyrene, 2,4,6-trimethylstyrene, 4-p-tolylstyrene, 3,5-diphenylstyrene, 3-ethyl-vinylnaphthalene or 8-phenyl-1-vinylnaphthalene or mixtures thereof.

Styrene is the preferred main alkenyl substituted aromatic compound, optionally mixed with minor amounts of one or more other specified alkenyl substituted aromatics.

Suitable polymer blocks B may be prepared from e.g. 1,3-butadiene, 2-methyl-1,3-butadiene (isoprene), 1,3-pentadienes (piperylenes), 2,3-dimethyl-1,3-butadiene, 2-methyl-1,3-pentadiene, 2,3-dimethyl-1,3-pentadiene, 2-phenyl-1,3-butadiene or 1-phenyl-1,3-butadiene or mixtures thereof. Isoprene and 1,3-butadiene or mixtures thereof, are preferred conjugated dienes, of which 1,3-butadiene is most preferred as main monomer which optionally may be mixed with minor amounts of other specified conjugated diene monomers.

Examples of suitable block copolymers to be incorporated into the compositions of the present invention, were found to be Kraton D-1118X and Kraton G 1701X (Kraton is a trade mark) but it will be appreciated that other resembling block copolymers can also be successfully applied.

The conversion of the polyphenylene ether or structurally related polymer and the dissolution of the rubbery components is preferably carried out at a temperature in the range of from 0° to 60° C. and more preferably from 10° to 30° C. During the conversion of the polyphenylene ether or structurally related polymer, the catalyst may preferably be used in a concentration in the starting reaction mixture of from 0.0025 to 0.1% by weight and most preferably of form 0.01 to 0.075% by weight, calculated on the weight of the complete reaction mixture comprising the polyphenylene ether and the vinyl substituted aromatic monomer(s).

The capping agent according to the formulae IIa or IIb may be used in a concentration in the starting reaction mixture, e.g. in styrene of from 0.05 to 0.5% by weight and more preferably from 0.1 to 3% by weight, calculated on the weight of the complete reaction mixture.

It will be appreciated that in case a polyphenylene ether derivative, bearing terminal free hydroxy groups, is used a corresponding excess amount of the capping agent is used.

The prepolymerization step (c) may be carried out thermally or by initiation by a radical forming initiator, but preferably thermally by using temperatures in the range of from 110° to 150° C.

The prepolymerized reaction mixture is suspended into water in order to form beads by aqueous suspension polymerization. These beads may be optionally impregnated by a physically and/or chemically blowing agent such as n-pentane or halogenated hydrocarbons during or after the polymerization process. If impregnation has to take place during polymerization, it is carried out under pressure in the presence of a suitable amount of blowing agent. During the polymerization steps (b) and (c) one or more auxiliaries may be added such as fillers, fibres or non woven webs, dyes, stabilizers or flame retardants.

According to a preferred embodiment of the aqueous suspension polymerization, the amount of water may vary from 1 to 10 parts by weight, per part of weight of the reaction mixture containing the modified polyphenylene ether or structurally related polymer and vinyl substituted aromatic monomer(s) and preferably from 1-2 parts water per part by weight of reaction mixture. The aqueous dispersion to be used may optionally contain a dispersion stabilizer and one or more polymerization catalysts.

Examples of such dispersion stabilizers include polyvinyl alcohol, gelatine, agar, starch, glycerine, sodium salt of polyacrylic acid and polymethacrylic acid, polyethylene glycol, hydroxyethyl cellulose, carboxymethyl cellulose, methyl cellulose, ethylene glycol, polyacrylamide and 1:1 copolymer of e.g. styrene and maleic anhydride. The amount of the dispersion stabilizer to be used is ordinarily from 0.0001 to 3% by weight and preferably from 0.001 to 1.5% by weight and more preferably 0.01 to 0.7% by weight, based on the weight of the water used.

Typical examples of the polymerization catalysts include decanoylperoxide; benzoylperoxide; laurylperoxide; octanoylperoxide; stearylperoxide; 3,5,5-trimethylhexanoylperoxide; tert-butylperbenzoate; tert-butylperacetate; tert-butylperpivalate; diisopropylphenylhydroperoxide; 2,5-dimethyl-2,5-di-tert-butylperoxyhexane; di-tert-butylperoxide; cyclohexanoneperoxide; dicumylperoxide; α,α'-azobis(isobutyronitrile), tert-butylperoxyisobutyrate and tert-butylperoxylaurate.

These radical initiators are preferably high temperature decomposing type catalysts or are used in the form of a combination of 2 or more catalysts, e.g. a combination of a low temperature decomposing type catalyst with a high temperature decomposing type catalyst. In case the combination of a low temperature decomposition type catalyst with a high temperature decomposing type catalyst is used, the polymerization is effected initially at a temperature in the range from 85° to 95° C. and, after a certain extent of polymerization yield has been attained, the temperature of the system is elevated to carry out the polymerization substantially completely at a high temperature in the range of from 110° to 130° C.

Preferred combinations of the catalysts used include combinations of lauroylperoxide with dicumylperoxide; lauroylperoxide with di-tert-butylperoxide; lauroylperoxide with tert-butylperoxybenzoate; lauroylperoxide with 2,5-dimethyl-2,5-di-tert-butylperoxyhexane; lauroylperoxide with benzoylperoxide; 3,5,5-trimethylhexanoylperoxide with dicumylperoxide; 3,5,5-trimethylhexanoylperoxide with tert-butylperoxybenzoate; 3,5,5-trimethylhexanoyl peroxide with benzoylperoxide; 3,5,5-trimethylhexanoylperoxide with di-tert-butylperoxide; tert-butylperoxypivalate with di-tert-butylperoxide; tert-butylperoxypivalate with dicumylperoxide; tert-butylperoxypivalate with tert-butylperoxybenzoate; 2,4-dichlorobenzoylperoxide with tert-butylperoxybenzoate; 2,4-dichlorobenzoylperoxide with dicumylperoxide; 2,4-dichlorobenzoylperoxide with di-tert-butylperoxide; 2,4-dichlorobenzoylperoxide with 2,5-dimethyl-2,5-di-tert-butylperoxyhexane; octanoylperoxide with dicumylperoxide, octanoylperoxide with di-tert-butylperoxide, and benzoylperoxide with di-tert-butylperoxybenzoate.

In the present invention, the catalyst may be used in an amount suitable for polymerization of the alkenyl substituted aromatic compound. For adequate practice of the present invention, the catalyst is used in an amount of 0.01 to 1% by weight, preferably 0.3 to 0.7% by weight, based on the weight of the fed monomers.

It will be appreciated that another aspect of the present invention is formed by the polymer compositions in the form of expandable or non-expandable beads, obtainable by the hereinbefore described process, and which may be applied for the manufacture of shaped articles by e.g. injection moulding or extrusion and the like.

Said polymer compositions comprise
(a) at least one polyphenylene ether or a structurally related polymer, the original free hydroxy groups in which has been capped by conversion with a capping agent, in an amount in the range of from 5 to 30% by weight, and preferably from 10 to 25% by weight,
(b) poly(alkenyl substituted aromatic),
(c) at least one EPDM rubber, derived from ethylene, propylene and norbornene derivative monomers, having a specific density in the range of from 0.85 to 0.95, a Mooney viscosity (ML(1+4)125° C.) in the range of from 30 to 80, an ethylene content in the range of from 50 to 70% by weight, in an amount of from 5 to 20% by weight and preferably from 7-15% by weight,
(d) a diblock copolymer AB, optionally mixed with minor amounts of triblock copolymers ABA wherein A represents a poly(alkenyl substituted aromatic) block and preferably polystyrene and B represents an optionally hydrogenated poly conjugated diene block, and preferably polybutadiene or poly(isoprene), and having a number average molecular weight in the range of from 10,000 to 1,000,000, in an amount of from 1 to 5% by weight and preferably 2 to 4% by weight.

These compositions are characterized by very attractive mechanical and thermal properties and more particularly by an excellent impact strength, (notched) $A_{ko}$(0° C.) being for example in the range of from 4.7 to 6.0 kJ/m$^2$, measured according to DIN 53453 (Izo norm 179).

It is assumed that these characteristics and more particularly the excellent impact strength are caused by the characteristic continuous micro structure of a chemical polymer blend which is obtainable by the hereinbefore described process and which appeared to be maintained after several times reprocessing the blend.

It will be appreciated that this specific polymer blend microstructure and the accompanying attractive properties of such blend surprisingly could only be obtained in a rather small area of combinations of EPDM rubber content; styrene monomer conversion during the prepolymerization step, and polyphenylene content, each of which appeared to must have a value in a critical range.

Figure 2:
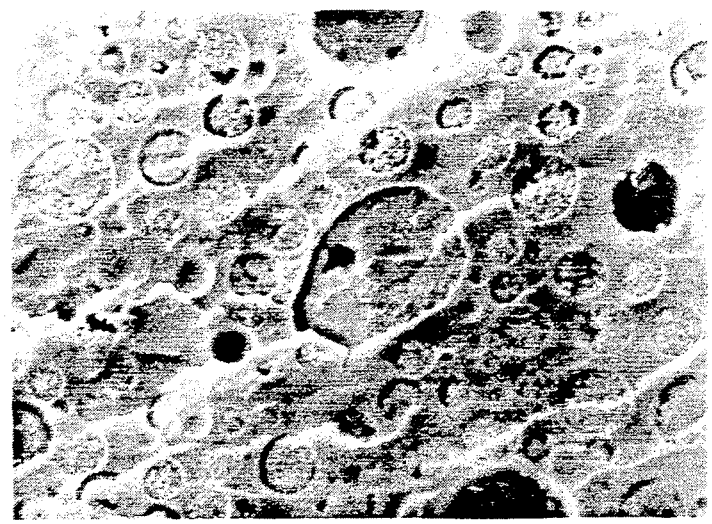
Figure 3:
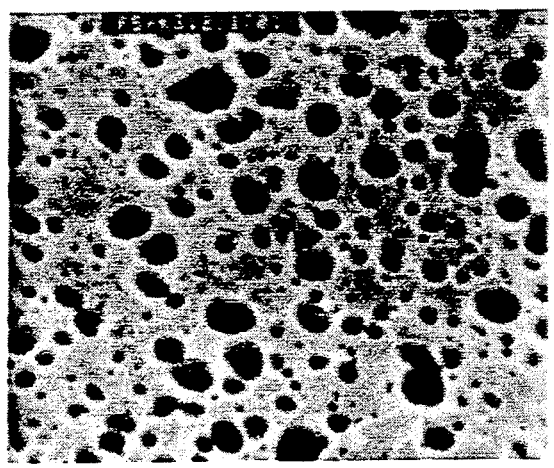
FIG. 3 is a photomicrograph of a prior art composition.

Said typical continuous chemical blend structure in contrast to the discontinuous, dispersed mechanical blend structure obtained by using the conventional compounding techniques, using melt-kneaders, such as single or twin-screw extruders and the like will be appreciated from the electron microscopic pictures of the FIGS. 1 and 2 relating to compositions obtained according to the present invention and FIG. 3, relating to a composition obtained by prior art mechanical blending.

The invention is further illustrated by the following examples, however without restriction of its scope to these specific embodiments.

EXAMPLE 1

15 g of poly-2,6-dimethyl-1,4-phenylene ether (PPE) having a number average mol weight in the range of from Mn 20,000 to 30,000, (such as PPE type 800 and type 808 from General Electric Plastics showing an intrinsic viscosity (IV) in chloroform at 25° C. of 0.46 and 0.40) was dissolved in 72 g of styrene in about 1 hr at room temperature. Subsequently acetic anhydride and N,N-dimethyl-4-aminopyridine (DMAP) were added in amounts of 0.1% by weight and 0.01% by weight respectively, calculated on the weight of total reaction mixture. After 1 hr stirring at room temperature a small sample of the reaction mixture was precipitated in methanol at room temperature and an infrared absorption spectrum was measured, showing a characteristic absorption maximum at 1765 cm$^{-1}$ and missing the characteristic absorption maximum related to the presence of free terminal hydroxyl groups.

Hereafter 10 g EPDM rubber containing 66% by weight of ethylene monomer and 1% of ethylidene norbornene monomer (Keltan K 740, Keltan is a trade mark) and 3 g of a polystyrene-hydrogenated polyisoprene diblock polymer (Kraton G1701 X, Kraton is a trade mark) were added to the reaction mixture.

The temperature is increased to about 70° C. after dissolution of these rubbers and the prepolymerization is carried out under stirring at 130° C. to a polymerization degree of 15%. This reaction mixture is added to 150 g water, containing 0.2% by weight of Natrosol 250 G (Natrosol is a trade mark) having a temperature of 70° C.

Then the obtained suspension was heated to 93° C. and radical polymerized during 5 hours in the presence of dibenzoylperoxide (DBPO), followed by subsequent reaction during three hours at 120° C. in the presence of tert-butylperoxybenzoate (TBPB).

Regular spherical beads were obtained showing a Tg of about 110° and an impact strength $A_{ko}$ (0° C. notched) according to DIN 53453 (Izo norm 179) of 4.9 kJ/m$^2$.

EXAMPLE 2

In the same way as described in Example 1 capped PPE was prepared, using acetic anhydride and DMAP and 10 g EPDM rubber containing 55% by weight ethylene and 4% of polymerized ethylidene norbornene (Keltan K 312) (Keltan is a trade mark) and 3 g of Kraton D-1118 X (Kraton is a trade mark), a polystyrene-hydrogenated polybutadiene diblock, having a styrene/butadiene weight ratio of about 30:70 and a number average molecular weight of the styrene block in the range of from 15,000 to 20,000, were added to the reaction mixture.

The prepolymerization step and subsequent suspension polymerization step are carried out in the same way as indicated in Example 1, giving regular spherical beads showing a Tg of about 110° C. and an impact strength (notched $A_{ko}$ (0° C.) according to DIN 53453 (Izo norm 179) of 4.8 kJ/m$^2$.

EXAMPLE 3

15 g PPE having a number average mol weight in the range of from 20,000 to 30,000 was dissolved in 72 g of styrene in about one hour at room temperature. Subsequently maleic anhydride and sodium hydride were added in amounts of 0.1% by weight respectively, calculated on the weight of the total reaction mixture.

After one hour stirring at room temperature a small sample of the reaction mixture was precipitated in methanol at room temperature and an infrared absorption spectrum was measured, showing characteristic absorption maxima at 3500-2700 cm$^{-1}$ and at 1710 cm$^{-1}$ and 1725 cm$^{-1}$.

Hereafter 10 g EPDM rubber containing 55% by weight ethylene and 4.5% by weight of polymerized dicyclopentadiene (Keltan K 740) (Keltan is a trade mark) and 3 g of Kraton D-1118 X (Kraton is a trade mark) were added to the reaction mixture.

The polymerization steps were carried out as described in Example 1, giving regular spherical beads showing a Tg of 111° C. and an impact strength (notched) according to DIN 53453 (Izo norm 179) of 5.0 kJ/m$^2$.

EXAMPLE 4

10 g PPE (General Electric Plastics, Type 800, IV ±I.V. 0,46 (CHCl$_3$, 25° C.)) was dissolved in 80 g styrene in about one hour at room temperature.

Subsequently a mixture of acetic anhydride and DMAP (dimethylaminopyridine) were added in amounts of 0,15% and 0,017% by weight respectively, calculated on the weight of total reaction mixture.

After PPE was end-capped, the temperature was increased until 70° C. Hereafter 5 g EPDM rubber as specified in Example 1 was added to the reaction mixture. The polymerization steps were carried out as described in example 1, with the exception that the propolymerization at 130° C. was continued until 10% and that after 5 hours suspension polymerization at 90° C., 7% pentane was added to the mixture, resulting in a reactor pressure of 7-8 bar.

After one hour at 90° C., the reaction was continued using TBPB.

Regular spherical beads containing pentane were obtained. From this blend a suitable foam could be produced.

EXAMPLE 5

10 g PPE (General Electric Plastics Type 800) having a number average mol weight in the range of from 20,000 to 30,000 was dissolved in 100 gr styrene in about one hour at room temperature.

Subsequently tosylchloride, triethylamine and DMAP were added in amounts to give concentrations of 0,2% and 0.05% by weight respectively (calculated on the toal reaction system weight). After stirring one hour at room temperature the mixture was heated until 70° C. and 10 gr EPDM rubber (Keltan K740) (Keltan is a trade mark) was added. Hereafter the solution was heated to 130° C. and prepolymerized until a conversion of 10% polystyrene. This total reaction mixture was added to 130 g water having a temperature of 70° C., containing 0,2% Natrosol 250 G (Natrosol is a trade mark).

The polymerization steps were carried out under standard reaction conditions as described in example 1, resulting in regular spherical beads, Tg of 110° C. and a (notched) impact strength according to DIM 53453 of 5,0 kJ/m$^2$.

We claim:

1. Poly(alkenyl substituted aromatic) containing polymer compositions, obtained by a process comprising:
   (a) reacting a polyphenylene ether or a structurally related polymer thereof of the formula

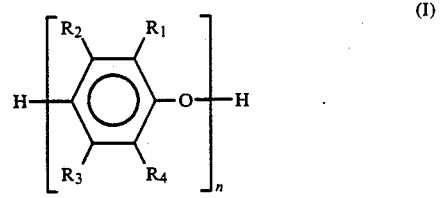

(I)

wherein $R_1$ and $R_4$ each may represent hydrogen, halogen, a phenyl group, alkenyl group, alkadienyl group, an aryloxy group, or wherein $R_1$ and $R_4$ each may represent an alkyl group or an alkoxy group, each of the latter containing 12 or less carbon atoms and each optionally substituted by halogen, cyano, hydroxy, phenyl or amino, whereas alkyl or alkoxy groups attached to the terminal phenol nucleus of the chain may be substituted by an amino, dialkylamino or a di(alkanoyl) amide group, wherein the alkyl groups each contain 4 or less carbon atoms, wherein $R_2$ and $R_3$ each may represent hydrogen, halogen, a phenyl group, alkenyl group, alkadienyl group, aryloxy group or wherein $R_2$ and $R_3$ each may represent a primary or secondary alkyl group or alkoxy group as defined for $R_1$ and $R_4$, optionally substituted by halogen, cyano, hydroxy, phenyl, and wherein $R_1$, $R_2$, $R_3$ and $R_4$ may represent different or the same groups in one repeating unit, and n represents an integer having a value of at least 50 and more preferably 100 to 500, with an acid halide, an acid anhydride or ketene, in at least one alkenyl substituted aromatic monomer, the amount of polyphenylene ether or structurally related polymer in the reaction mixture being in the range of from 5 to 30% by weight calculated on the complete final composition;

(b) dissolving at least one ethylenepropylenediene monomer (EPDM) rubber having a specific density in the range of from 0.85 to 0.95, a Mooney viscosity (ML(1+4) 125° C.) in the range of from 30 to 80, an ethylene content in the range of from 50 to 70% by weight, in the reaction mixture of step (a) in an amount of from 5 to 20% by weight together with a diblock copolymer A—B which is optionally partially hydrogenated, optionally mixed with minor amounts of triblock copolymers A—B—A, wherein A represents a poly(alkenyl aromatic) block and B represents an optionally, partially hydrogenated poly (conjugated diene) block, having a number average molecular weight in the range of from 10,000 to 1,000,000 and showing a glass transition temperature of −20° C. or below, said diblock copolymer being added to the reaction mixture of step (a) in an amount of from 1 to 5% by weight calculated on the weight of the complete final composition;

(c) prepolymerizing the obtained mixture until a prepolymerized mass is formed having a degree of polymerization of from 5 to 20%;

(d) suspending the resulting prepolymerized mass in an aqueous medium; and (e) polymerizing by thermal initiation or by means of at least one free radical initiator, optionally in the presence of an expanding agent, the prepolymerized mass of step (d).

2. Polymer compositions according to claim 1, obtained by said process, step (a) of which is carried out in a predominantly styrene monomer containing mixture.

3. Polymer compositions according to claim 1, obtained by said process, step (a) of which is carried out with an acid halide or a non-cyclic acid anhydride as capping agent selected from compounds of the formulae:

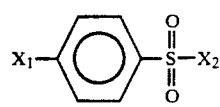

(II A)

or

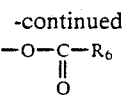

(II B)

wherein $X_1$ represent halogen or an alkyl group containing 1 to 4 carbon atoms, and which may optionally be substituted by halogen, wherein $X_2$ represents halogen, and wherein $R_5$ and $R_6$ each independently represent an alkyl, alkenyl, aryl or aralkyl group, containing from 1 to 12 carbon atoms and optionally being substituted by hydroxy, halogen, alkyl containing 1 to 4 carbon atoms, or a free or esterified carboxyl group, in the presence of a catalyst of the formula:

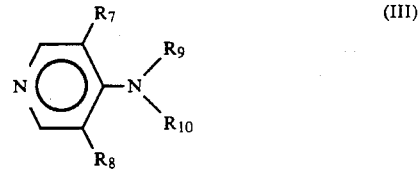

(III)

wherein $R_9$ and $R_{10}$ both represent alkyl groups containing from 1 to 4 carbon atoms, optionally substituted by at most one phenyl group and wherein $R_7$ and $R_8$ represent hydrogen, halogen or lower alkyl, while $R_9$ and $R_{10}$ may represent different or the same groups, and optionally in the presence of a neutralizing agent.

4. Polymer compositions according to claim 3, obtained by said process, step (a) of which is carried out with a capping agent selected from the group consisting of parabromomethylphenylsulphonyl bromide, para-bromomethylphenylsulphonyl chloride, acetic anhydride, benzoic anhydride and bromoacetic anhydride.

5. Polymer compositions according to claim 4, obtained by said process, step (a) of which is carried out with an acetic anhydride capping agent.

6. Polymer compositions according to claim 1, obtained by said process, step (a) of which is carried out with N,N-dimethyl-4-amino pyridine as catalyst.

7. Polymer compositions according to claim 1, obtained by said process, step (a) of which is carried out with an acid halide and an additional acid neutralizing agent.

8. Polymer compositions according to claim 7, obtained by said process, step (a) of which is carried out with a parabromomethylphenylsulphonyl bromide capping agent, N,N-dimethyl-4-amino pyridine as catalyst and triethylamine or tri-n-propylamine.

9. Polymer compositions according to claim 1, obtained by said process, step (a) of which is carried out with a capping agent selected from the formula

(IV)

wherein Y represents a bivalent radical of the formulae:

$$-(CH_2)_m-$$

(V)

or

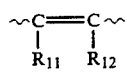

(VI)

wherein m represents an integer in the range of from 2 to 8 and wherein $R_{11}$ and $R_{12}$ may each independently represent an alkyl group of 1 to 4 carbon atoms, a phenyl group or an aralkyl group or wherein $R_{11}$ and $R_{12}$ together with the carbon atoms of the double carbon-carbon bond may form a cycloalkenyl, cycloalkadienyl or aryl group, in the presence of a non nucleophilic base.

10. Polymer compositions according to claim 9, obtained by said process, step (a) of which is carried out with maleic anhydride and sodium hydride.

11. Polymer compositions according to claim 1, wherein $R_1$ and $R_4$ in formula I represent methyl, optionally substituted when attached to the terminal phenol nucleus with amino or dialkylamino, and $R_2$ and $R_3$ represent hydrogen.

12. Polymer compositions according to claim 1, obtained by said process wherein in step (a) said polyphenylene ether or structurally related polymer is added in an amount in the range of from 10 to 25% by weight, relative to the weight of complete final composition.

13. Polymer compositions according to claim 1, obtained by said process, wherein in step (c) a prepolymerization degree of from 8 to 15% is achieved.

14. Polymer compositions according to claim 1, obtained by said process, in step (b) of which EDPM copolymers are employed, which contain from 50 to 705 by weight ethylene, and from 0.5 to 12% by weight of a norbornene derivative and exhibit a number average molecular weight in the range of from 40 to 90 kg/mole and an Mw/Mn ratio in the range of from 2.0 to 4.0.

15. Polymer compositions according to claim 1, obtained by said process, in step (b) of which diblock A—B copolymers are employed, having a number average molecular weight in the range of from 50,000 to 800,000 and which have a content of the alkenyl substituted aromatic in the range of from 20 to 40% by weight.

16. Process for the preparation of poly(alkenyl substituted aromatic) containing polymer compositions comprising:

(a) reacting a polyphenylene ether or a structurally related polymer thereof of the formula

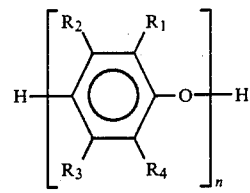

(I)

wherein $R_1$ and $R_4$ each may represent hydrogen, halogen, a phenyl group, alkenyl group, alkadienyl group, an aryloxy group, or wherein $R_1$ and $R_4$ each may represent an alkyl group or an alkoxy group, each of the latter containing 12 or less carbon atoms and each optionally substituted by halogen, cyano, hydroxy, phenyl or amino, with alkyl or alkoxy groups attached to the terminal phenol nucleus of the chain optionally being substituted by an amino, dialkylamino or a di(alkanoyl) amide group, wherein the alkyl groups each contain 4 or less carbon atoms, wherein $R_2$ and $R_3$ each represent hydrogen, halogen, a phenyl group, alkenyl group, alkadienyl group, aryloxy group or wherein $R_2$ and $R_3$ each represent a primary or secondary alkyl group or alkoxy group as defined for $R_1$ and $R_4$, optionally substituted by halogen, cyano, hydroxy, phenyl, and wherein $R_1$, $R_2$, $R_3$ and $R_4$ represent different or the same groups in one repeating unit, and n represents an integer having a value of at least 50, with an acid halide, an acid anhydride or ketene, in at least one alkenyl substituted aromatic monomer, the amount of polyphenylene ether or structurally related polymer in the reaction mixture being in the range of from 5 to 35% by weight calculated on the complete final composition;

(b) dissolving at least one EPDM rubber having a specific density in the range of from 0.85 to 0.95, a Mooney viscosity (ML(1+4) 125° C.) in the range of from 30 to 80, an ethylene content in the range of rom 50 to 70% by weight, in the reaction mixture of step (a) in an amount of from 5 to 20% by weight together with a diblock copolymer A—B which is optionally partially hydrogenated, optionally mixed with minor amounts of triblock copolymer A—B—A, wherein A represents a poly(alkenyl aromatic) block and B represents an optionally, partially hydrogenated poly conjugated diene block, having a number average molecular weight in the range of from 10,000 to 1,000,000 and exhibiting a glass transition temperature of −20° C. or below, said diblock copolymer being present in an amount of from 1 to 5% by weight calculated on the weight of the complete final composition;

(c) prepolymerizing the obtained mixture until a prepolymerization mass is formed having a degree of polymerization of from 5 to 20%;

(d) suspending the prepolymerized mass in an aqueous medium; and (e) polymerizing by thermal initiation or by means of at least one free radical initiator, optionally in the presence of an expanding agent, the prepolymerized mass of step (d).

* * * * *

UNITED STATES PATENT AND TRADEMARK OFFICE
CERTIFICATE OF CORRECTION

PATENT NO. : 5,079,268

DATED : January 7, 1992

INVENTOR(S) : LAURENTIUS N. I. H. NELISSEN ET AL.

It is certified that error appears in the above-identified patent and that said Letters Patent is hereby corrected as shown below:

Column 16, Claim 3, line 10 of the claim, "represent" should read --represents--.

Column 17, Claim 14, line 2 of the claim, "EDPM" should read --EPDM--; and line 4 of the claim, "705" should read --70%--.

Column 17, Claim 16, line 40 of the claim, "rom" should read -from--.

Signed and Sealed this

First Day of June, 1993

Attest:

MICHAEL K. KIRK

Attesting Officer     Acting Commissioner of Patents and Trademarks